(12) United States Patent
Moyes

(10) Patent No.: US 9,640,139 B2
(45) Date of Patent: May 2, 2017

(54) UEFI VIRTUAL VIDEO CONTROLLER

(71) Applicant: Dell Products, LP, Round Rock, TX (US)

(72) Inventor: William A. Moyes, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 46 days.

(21) Appl. No.: 14/697,057

(22) Filed: Apr. 27, 2015

(65) Prior Publication Data

US 2016/0314758 A1 Oct. 27, 2016

(51) Int. Cl.
*G09G 5/00* (2006.01)
*G06F 13/362* (2006.01)
*G06F 13/28* (2006.01)

(52) U.S. Cl.
CPC ............ *G09G 5/006* (2013.01); *G06F 13/28* (2013.01); *G06F 13/362* (2013.01); *G09G 2360/18* (2013.01)

(58) Field of Classification Search
CPC .... G09G 5/006; G09G 2360/18; G06F 13/28; G06F 13/362

USPC ........................................................ 345/547
See application file for complete search history.

(56) References Cited

U.S. PATENT DOCUMENTS

| 7,093,117 B2 | 8/2006 | Chen et al. |
| 9,008,113 B2 | 4/2015 | Pope et al. |
| 2012/0159520 A1* | 6/2012 | Ueltschey, III ..... G06F 9/45508 719/323 |
| 2013/0159602 A1 | 6/2013 | Adams et al. |
| 2014/0136828 A1* | 5/2014 | Lewis .................. G06F 9/4445 713/2 |

* cited by examiner

*Primary Examiner* — Kimberly A Williams
(74) *Attorney, Agent, or Firm* — Larson Newman, LLP

(57) ABSTRACT

An information handling system includes a processor; a memory, a firmware, and a video agent. The memory includes a frame buffer for image data. The frame buffer accessible to an operating system. The firmware is configured to present to the operating system a graphics output protocol. The graphics output protocol includes an address of the portion of the reserved portion of the memory and soft video display parameters. The video agent is configured to retrieve image data from the reserved portion of the memory, and provide the image data to an external system for remote video display to be completed upon finalization of application.

20 Claims, 3 Drawing Sheets

UEFI VIRTUAL VIDEO CONTROLLER

FIELD OF THE DISCLOSURE

The present disclosure generally relates to information handling systems, and more particularly relates to video controllers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
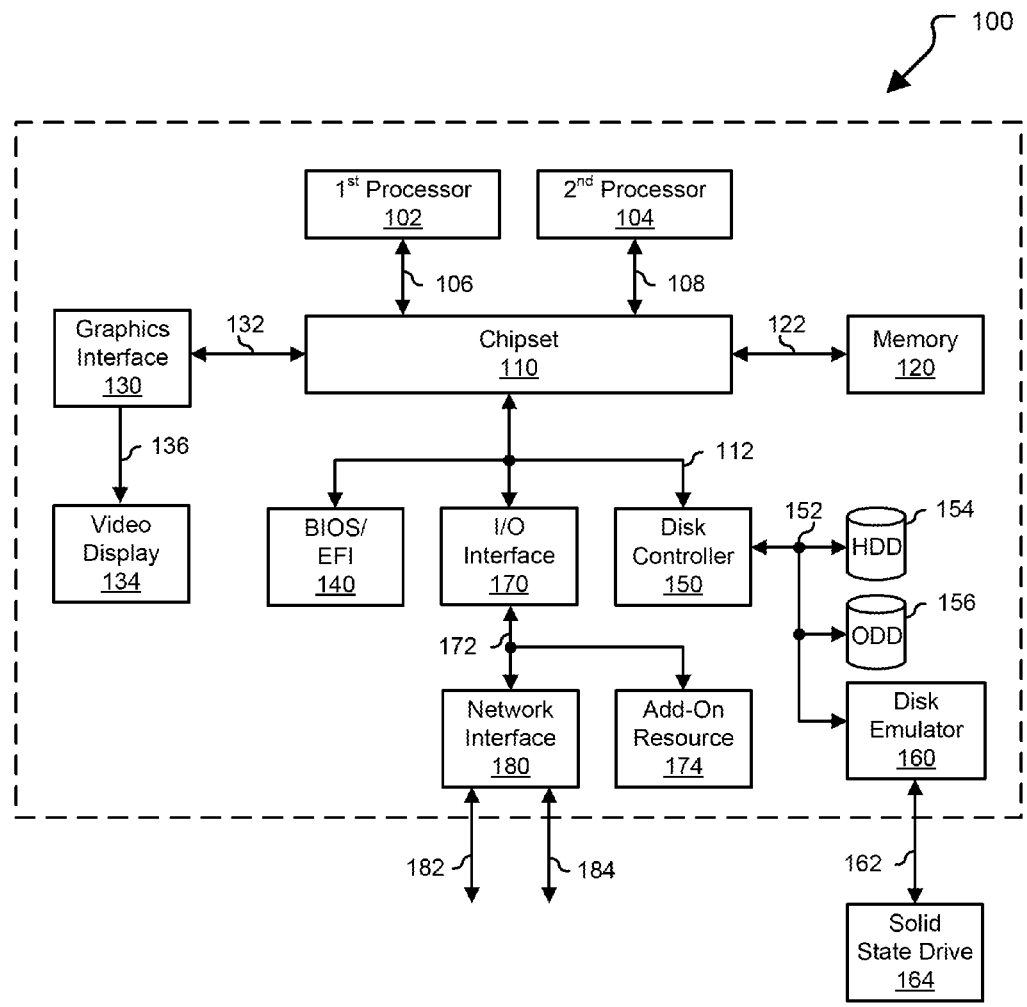
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
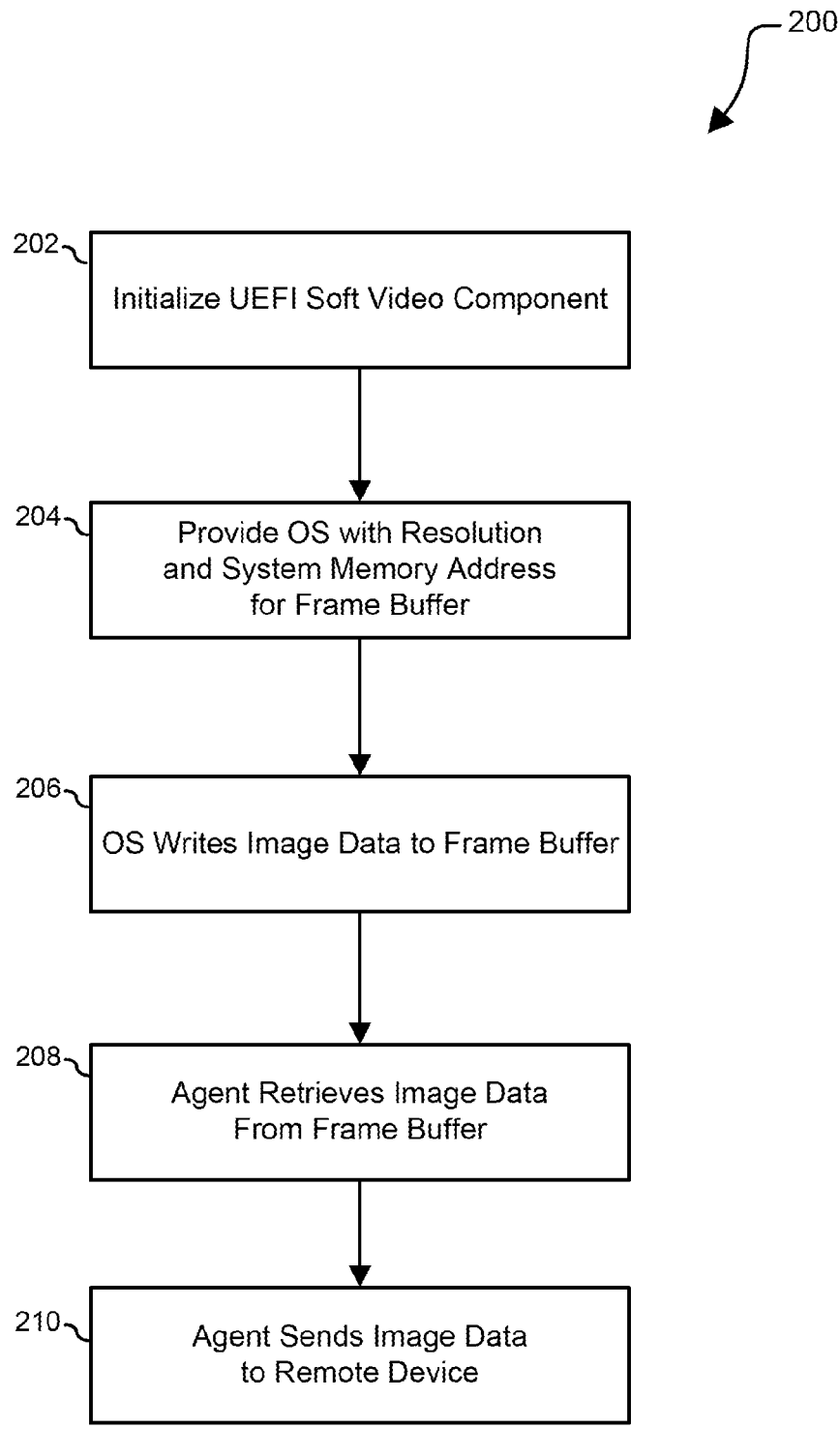
FIG. 2 is a flow diagram illustrating a method of providing a soft video controller, in accordance with various embodiments.

FIG. 2 is a flow diagram illustrating a method of providing graphics output using a soft video controller. In various embodiments an information handling system, such as information handling system 100 of FIG. 1, can forgo video display 134 and instead utilize a remote system for video. Furthermore, graphics interface 130 can be implemented as a soft video controller eliminating the need for video hardware and the associated connectors. At 202 a firmware, such as BIOS/EFI 140 in FIG. 1, can initialize a soft video component. In various embodiments, the firmware can be a Unified Extensible Firmware Interface (UEFI) compliant firmware, and the soft video component can be a UEFI Graphics Output Protocol (GOP) driver. The soft video component can reserve a portion of system memory as a frame buffer and mark the memory as unavailable to an operating system (OS). Additionally, the soft video component can add an entry to a UEFI handle database containing a device path for the soft video component as well as a graphic output protocol. The soft video component, through the GOP, can provide a query mode subroutine to report a resolution and pixel format for graphics output and a set mode subroutine to select between the available modes. In various embodiments, the query mode may provide a default resolution required by a standard. In various embodiments, the query mode may provide only one resolution and the set mode subroutine can support the single available mode. In various embodiments, the resolution can include a horizontal resolution of 1024 pixels and a vertical resolution of 768 pixels, and the pixel format can include 32-bit BGRx.

Additionally, in various embodiments, the soft video component can provide a block transfer subroutine through the GOP. The block transfer subroutine can be an executable function for manipulating image data in the frame buffer. The block transfer subroutine can be used during startup of the information handling system or by an OS that does not have a built driver. The soft video component can further provide a descriptor that provides the physical address of the frame buffer in the system memory, the resolution, and the pixel format.

During boot up and initialization, the block transfer subroutine can be used to write image data to the frame buffer. At 204, when control of the information handling system is given to the operating system, the soft video component can provide the OS with the physical address of the frame buffer in the system memory, the resolution, and the pixel format by way of the descriptor. At 206, the OS can then write image data to the frame buffer, such as by using a built-in video driver.

At 208, a graphics output agent can retrieve the image data from the frame buffer, and, at 210, the graphics output agent can send the data to a remote device for display. In various embodiments, the graphics output agent can include a system management interrupt to interrupt processes running on the CPU to obtain the resources needed to retrieve and process the image data for transfer to the remote device. In various embodiments, the graphics output agent can utilize a joint test action group (JTAG) debug mode of a processor to obtain the image data from the frame buffer. In various embodiments, the graphics output agent can utilize direct memory access to retrieve the image data from the frame buffer.

In various embodiments, the graphics output agent can communicate with the remote system by way of a direct connection, such as a RS232 serial port. In other embodiments, the graphics output agent can communicate with the addressable link, such as Ethernet, IEEE 1394 (FireWire), USB, or the like. In various embodiments, the connection between the information handling system and the remote system can be one-to-one, one-to-many, such that the graphics output of the information handling system can be accessed from multiple remote device either sequentially or concurrently, or many-to-one, such that one remote device can access the graphics output from multiple information handling systems either sequentially or concurrently.

Figure 3:
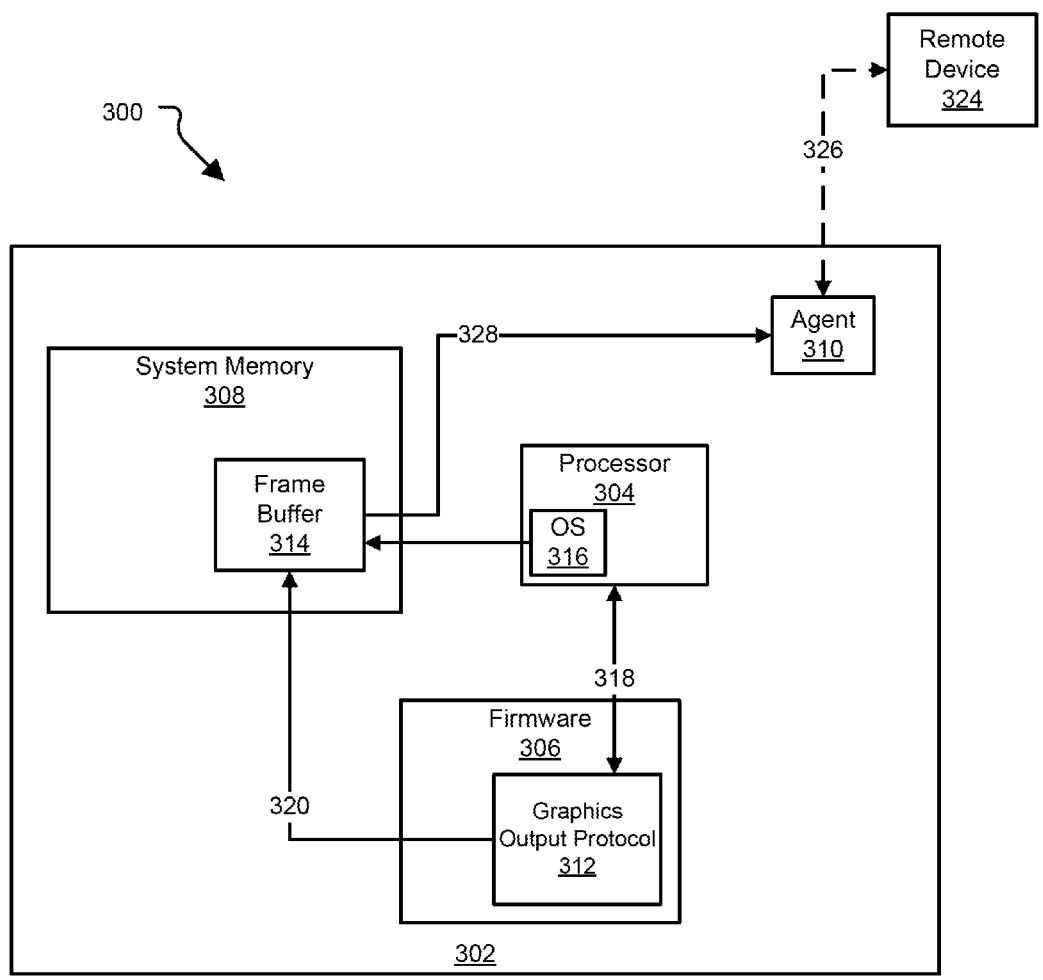
FIG. 3 is a block diagram illustrating information flow in an information handling system using a soft video controller, in accordance with various embodiments.

FIG. 3 is a block diagram 300 illustrating an exemplary flow of information through an information handling system and to a remote device when using a soft video controller. Information handling system 302 can include a processor 304, a firmware 306, a system memory 308, and a graphics output agent 310. Upon startup, processor 304 can execute instructions stored in the firmware to initialize a graphics output protocol. Initialization of the graphics output protocol can establish a frame buffer 314 within the system memory 308. The frame buffer 314 can be reserved to prevent an OS 316 from allocating the memory to another process. During startup, when the processor generates image data, such as data to be written to a display device, the processor can send the image data to a block transfer subroutine of the graphic output protocol 312 (arrow 318), and the block transfer subroutine can write the image data to the frame buffer 314 (arrow 320). When control is passed to OS 316, OS 316 can utilize a built-in graphics drive to write image data to the frame buffer 314 (arrow 322).

A remote device 324 can establish a connection 326 with graphics output agent 310. Graphics output agent 310 can retrieve the image data from the frame buffer (arrow 328) and provide the image data to the remote device via the established connection 326. In various embodiments, the remote device 324 can establish the connection 326 with the graphics output agent 310 during start-up and monitor the graphics output prior to control being handed over to OS 316 and the remote device 324 can continue to receive graphics output as control of the information handling system 302 is handed off to the OS 316. Alternatively, the remote device 324 can establish a connection with the graphics output agent 310 after control has passed to OS 316.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system without video hardware and associated connectors, comprising:
a processor;
a system memory;
a firmware configured to:
initialize a soft video controller, the soft video controller including instructions to:
reserve a portion of the system memory as a frame buffer and mark the memory as unavailable for an operating system to allocate to another process; and
present to the operating system a graphics output protocol, the graphics output protocol including an address of the portion of the reserved portion of the memory and soft video display parameters; and
a video agent configured to:
retrieve image data from the frame buffer; and
provide the image data to an external system for remote video display;
wherein the video agent is configured to provide image data to the external system prior to and after control of the information handling system being handed off to the operating system.

2. The information handling system of claim 1, wherein the graphics output protocol is a Unified Extensible Firmware Interface graphics output protocol.

3. The information handling system of claim 1, wherein the soft video display parameters include a resolution and a pixel format.

4. The information handling system of claim 3, wherein resolution includes a 1024 pixel vertical resolution and a 768 pixel horizontal resolution.

5. The information handling system of claim 1, wherein the memory is a dynamic random access memory.

6. The information handling system of claim 1, wherein the video agent includes direct memory access.

7. A method for operating an information handling system without video hardware and associated connectors, comprising:
reserving a portion of system memory as a frame buffer;
initializing a graphics output protocol with a pointer to the frame buffer;
providing to an operating system display parameters and the pointer to the frame buffer;
writing image data, by the operating system, to the frame buffer;
accessing the frame buffer, by a video agent, to retrieve the image data; and
providing the image data retrieved from the frame buffer by the video agent to an external system prior to and after control of the information handling system being handed off to the operating system.

8. The method of claim 7, wherein the system memory is a dynamic random access memory.

9. The method of claim 7, wherein graphics output protocol is a Unified Extensible Firmware Interface graphics output protocol.

10. The method of claim 7, wherein the display parameters include a resolution and a pixel format.

11. The method of claim 10, wherein resolution includes a 1024 pixel vertical resolution and a 768 pixel horizontal resolution.

12. The method of claim 7, wherein accessing the frame buffer by the video agent utilizes direct memory access.

13. The method of claim 7, wherein accessing the frame buffer by the video agent utilizes a system management interrupt.

14. An information handling system without video hardware and associated connectors, comprising:
a processor;
an operating system comprising a built-in graphics driver;
a system memory;
a firmware configured to:
initialize a soft video controller; the soft video controller including instructions to:
reserve a portion of the system memory as a frame buffer and mark the memory as unavailable for an operating system to allocate to another process;
provide a block transfer function to manipulate the image data within the frame buffer; and
present to the operating system a graphics output protocol including an address of the frame buffer and soft video display parameters; and
a video agent configured to:
retrieve image data from the frame buffer; and
provide the image data to an external system for remote video display prior to and after control of the information handling system being handed off to the operating system;
wherein the built-in graphics driver is configured to write image data to the frame buffer based on the address of the frame buffer and the video display parameters provided by the graphics output protocol.

15. The information handling system of claim 14, wherein the graphics output protocol is a Unified Extensible Firmware Interface graphics output protocol.

16. The information handling system of claim 14, wherein the system memory is a dynamic random access memory.

17. The information handling system of claim 14, wherein the display parameters include a resolution and a pixel format.

18. The information handling system of claim 17, wherein resolution includes a 1024 pixel vertical resolution and a 768 pixel horizontal resolution.

19. The information handling system of claim 14, wherein the video access agent utilizes direct memory access.

20. The information handling system of claim 14, wherein the video access agent utilizes a system management interrupt.

* * * * *